United States Patent
Jan et al.

(10) Patent No.: US 8,630,661 B2
(45) Date of Patent: Jan. 14, 2014

(54) METHOD, MOBILE DEVICE AND COMPUTER-READABLE RECORDING MEDIUM FOR LOCATION-AWARE APPLICATION

(75) Inventors: Cheng-Shiun Jan, Taoyuan County (TW); Yih-Feng Kao, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 0 days.

(21) Appl. No.: 13/310,804

(22) Filed: Dec. 5, 2011

(65) Prior Publication Data
US 2013/0143600 A1    Jun. 6, 2013

(51) Int. Cl.
*H04W 24/00* (2009.01)
(52) U.S. Cl.
USPC ............. 455/456.3; 455/422.1; 455/436
(58) Field of Classification Search
USPC ......... 455/422.1, 423, 456.1–456.4, 436–442
See application file for complete search history.

(56) References Cited

U.S. PATENT DOCUMENTS

| | | | |
|---|---|---|---|
| 2004/0146043 A1* | 7/2004 | Hiraoka et al. | 370/350 |
| 2005/0096068 A1* | 5/2005 | Bahl et al. | 455/456.1 |
| 2012/0166256 A1* | 6/2012 | Wang et al. | 705/13 |

FOREIGN PATENT DOCUMENTS

TW          201038962         11/2010

OTHER PUBLICATIONS

"Office Action of Taiwan counterpart application" issued on Oct. 25, 2013, pp. 1-9.

* cited by examiner

*Primary Examiner* — Chuong A Ngo
(74) *Attorney, Agent, or Firm* — Jianq Chyun IP Office

(57) ABSTRACT

A method, a mobile device, and a computer-readable recording medium for a location-aware application are provided. In the method, at least one signal source around the mobile device and a signal strength thereof are detected by using a signal detecting module. Then, each detected signal source and the signal strength thereof are compared with a signal source and a signal strength thereof recorded in multiple system profiles, so as to find a system profile having matched signal source and signal strength, in which the system profiles include signal sources and signal strengths thereof which are recorded and detected by the mobile device at multiple different locations and a system setting of the mobile device applicable to each location. Finally, a system setting of a matched system profile is executed.

20 Claims, 4 Drawing Sheets

METHOD, MOBILE DEVICE AND COMPUTER-READABLE RECORDING MEDIUM FOR LOCATION-AWARE APPLICATION

BACKGROUND OF THE INVENTION

1. Field of the Invention

The present invention relates to a method and a device for sharing media contents, and more particularly to a method and a mobile device for implementing medium content sharing by location-awareness.

2. Description of Related Art

The Digital Living Network Alliance (DLNA) is a uniform transmission specification formulated by multiple operators commonly, which enables different brands or different multimedia devices to communicate with each other and transmit data. The DLNA technology further integrates contents of digital multimedia, so that media contents stored in a computer such as a picture, music, a movie, and a play list may, through a local area network, be shared with other devices in the network.

Most of current mobile devices support wireless network surfing, and if the DLNA sharing mechanism is applied to a mobile device, wireless sharing may be implemented, and media contents stored in the mobile device are shared with a peripheral device. Specifically, a mobile device generally is equipped with wireless transmission modules such as Wireless Fidelity (WiFi) and Bluetooth, so that the mobile device may be linked to a local area network through a peripheral Access Point (AP). In this case, if the DLNA sharing mechanism is applied again, the mobile device may implement wireless sharing of media contents.

However, when the mobile device shares media contents thereof through the DLNA, it is required to first search the local area network for a Digital Media Player (DMP), a Digital Media Controller (DMC) or a Digital Media Renderer (DMR) supporting the DLNA, and then a user selects, from the local area network, a player around the location where the mobile device is located to play the media contents shared by the mobile device. Hereto, not only the user needs to remember the name and the location of each player to select a correct player, but also whenever the user moves to another room or site, the user further needs to reset or select a play device, which is rather inconvenient.

SUMMARY OF THE INVENTION

Accordingly, the present invention is directed to a method, a mobile device, and a computer-readable recording medium for a location-aware application, which may automatically select a peripheral player to play media contents according to a location where a user is located.

The present invention proposes a method for a location-aware application, which is applicable to a mobile device comprising a signal detecting module. The method comprises: using the signal detecting module to detect at least one signal source around the mobile device and a signal strength thereof; then, comparing each detected signal source and the signal strength thereof with a signal source and a signal strength thereof recorded in multiple system profiles, so as to find a system profile having matched signal source and signal strength, in which the system profiles comprise signal sources and signal strengths thereof which are recorded and detected by the mobile device at multiple different locations and a system setting of the mobile device applicable to each location; and finally, executing a system setting of a matched system profile.

In an embodiment of the present invention, the step of using the signal detecting module to detect the signal source around the mobile device and each signal strength comprises: using the signal detecting module to continuously detect for a preset time, so as to obtain multiple signal strengths, detected in the preset time, of each signal source.

In an embodiment of the present invention, the step of comparing each detected signal source and the signal strength thereof with a signal source and a signal strength thereof recorded in multiple system profiles, so as to find a system profile having matched signal source and signal strength comprises: determining whether the detected signal source and a signal source recorded in each system profile are matched; if the signal sources are matched, determining whether the signal strength of each detected signal source and a signal strength corresponding to the signal source recorded in the system profile are matched; and if the signal strengths are matched, determining that the detected signal source and the signal strength thereof are matched with the system profile.

In an embodiment of the present invention, the step of determining whether the detected signal source and a signal source recorded in each system profile are matched comprises: comparing an identifier of each detected signal source with an identifier of a signal source recorded in the system profile; and when the identifiers are the same, determining that the corresponding signal sources are matched.

In an embodiment of the present invention, the step of determining whether the detected signal source and a signal source recorded in each system profile are matched comprises: calculating the number of the detected signal sources and the number of signal sources matched with the signal source recorded in each system profile; then, calculating a ratio of the number of the signal sources to the number of the detected signal sources, and comparing the ratio with a first threshold; and if the calculated ratio is greater than the first threshold, determining that the detected signal source and the signal source recorded in the system profile are matched.

In an embodiment of the present invention, the step of determining whether the signal strength of each detected signal source and a signal strength corresponding to the signal source recorded in the system profile are matched comprises: for each signal source, calculating a first average of the detected signal strengths, and a second average of the signal strengths recorded in the system profile; then, calculating a difference between the first average and the second average, and comparing the difference with a second threshold; and if the calculated difference is less than the second threshold, determining that the detected signal source and the signal strength thereof are matched with the system profile.

In an embodiment of the present invention, the step of calculating the difference between the first average and the second average comprises: calculating a squared difference between the first average and the second average.

In an embodiment of the present invention, the step of determining whether the detected signal source and a signal source recorded in each system profile are matched further comprises: if the signal sources are unmatched, adding a system profile, and recording the detected signal source and the signal strength thereof in the system profile.

In an embodiment of the present invention, the step of determining whether the detected signal source and a signal source recorded in each system profile are matched further comprises: if the signal sources are unmatched, displaying an interface used to add a system profile, and recording the detected signal source and the signal strength thereof in the system profile.

In an embodiment of the present invention, the step of determining that the detected signal source and the signal strength thereof are matched with the system profile further comprises: adding the signal strength of each detected signal source to the corresponding signal source recorded in the system profile.

The present invention proposes a mobile device, comprising a signal detecting module, a storage module, a processing module, and a function module. The signal detecting module is used for detecting at least one signal source around the mobile device and at least one signal strength of each signal source. The storage module is used for recording multiple system profiles, in which the system profiles comprise signal sources and signal strengths thereof which are recorded and detected by the mobile device at multiple different locations and a system setting of the mobile device applicable to each location. The processing module is coupled to the signal detecting module and the storage module, and is used for comparing each signal source detected by the signal detecting module and the signal strength thereof with a signal source and a signal strength thereof in the system profiles recorded by the storage module, so as to find a system profile having a matched signal source and signal strength. The function module is coupled to the processing module, and is used for applying the system setting of the matched system profile found by the processing module to the mobile device, so as to execute a system function applicable to the location.

In an embodiment of the present invention, the signal detecting module comprises: continuously detecting for a preset time, so as to obtain multiple signal strengths, detected in the preset time, of each signal source.

In an embodiment of the present invention, the processing module comprises: determining whether the signal source detected by the signal detecting module and a signal source recorded in each system profile in the storage module are matched; if the signal sources are matched, then determining whether the signal strength of each detected signal source and a signal strength corresponding to the signal source recorded in the system profile are matched; and if the signal strengths are matched, determining that the detected signal source and the signal strength thereof are matched with the system profile.

In an embodiment of the present invention, the processing module comprises: for one of the system profiles recorded in the storage module, comparing an identifier of each signal source detected by the signal detecting module with an identifier of a signal source recorded in the system profile; and when the identifiers are the same, determining that the corresponding signal sources are matched.

In an embodiment of the present invention, the processing module comprises: calculating the number of the signal sources detected by the signal detecting module and the number of signal sources matched with the signal source recorded in each system profile in the storage module; and then calculating a ratio of the number of the signal sources to the number of the detected signal sources, and comparing the ratio with a first threshold; and if the calculated ratio is greater than the first threshold, determining that the detected signal source and the signal source recorded in the system profile are matched.

In an embodiment of the present invention, the processing module comprises: for each signal source, calculating a first average of the signal strengths detected by the signal detecting module and a second average of the signal strengths recorded in the system profile in the storage module; calculating a difference between the first average and the second average, and comparing the difference with a second threshold; and if the calculated difference is less than the second threshold, determining that the detected signal source and the signal strength thereof are matched with the system profile.

In an embodiment of the present invention, the difference is a squared difference between the first average and the second average.

In an embodiment of the present invention, if the processing module determines that the signal sources are unmatched, a system profile is added to the storage module, and the detected signal source and the signal strength thereof are recorded in the system profile.

In an embodiment of the present invention, if the processing module determines that the signal sources are unmatched, an interface used to add a system profile is displayed, the detected signal source and the signal strength thereof are recorded in the system profile, and the system profile is stored in the storage module.

In an embodiment of the present invention, if the processing module determines that the signal source detected by the signal detecting module and the signal strength thereof are matched with the system profile in the storage module, the signal strength of the corresponding signal source recorded in the system profile is updated with the signal strength of each detected signal source.

the present invention proposes a computer-readable recording medium, comprising a computer program used to execute the method for a location-aware application, this computer program is basically formed of multiple program code segments (such as, an establishment organization chart program code segment, an approval sheet program code segment, a setting program code segment, and a deployment program code segment), and after these program code segments are loaded into a mobile device and executed, the steps of the method for a location-aware application and functions of the mobile device may be accomplished.

Based on the above description, according to the method, the mobile device and the computer-readable recording medium for a location-aware application of the present invention, a peripheral signal source and the signal strength thereof are detected at different locations, and are recorded as a system profile, and subsequently when it is required to execute a location related system function, a detected signal may be compared with the system profile, so as to automatically find a device around the current location which may share media contents, thereby implementing automatic sharing of the media contents, and omitting the trouble of repetitive setting for a user.

In order to make the aforementioned features and advantages of the present invention more comprehensible, embodiments are illustrated in detail hereinafter with reference to accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
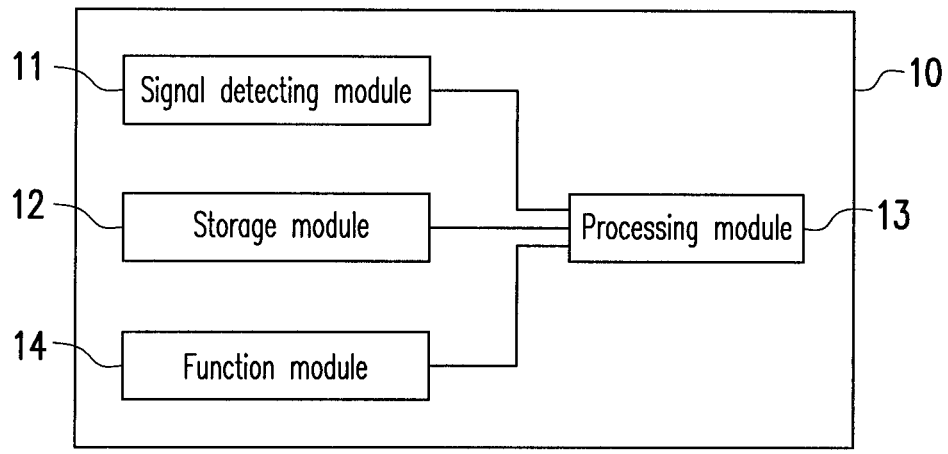
FIG. 1 is a block diagram of a mobile device according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

In the present invention, an association between signal sources and signal strengths thereof detected by a mobile device under different environments and preference settings for the environments is established by a user and is recorded as a system profile. Then, whenever the user enables a location related function in the mobile device, the mobile device automatically detects a peripheral signal source and the signal strength thereof, which are compared with multiple preset system profiles, thereby finding a preference setting corresponding to the current environment, and applying the preference setting to the executed function, thereby implementing a location-aware application.

FIG. 1 is a block diagram of a mobile device according to an embodiment of the present invention. Referring to FIG. 1, a mobile device 10 of this embodiment is, for example, a mobile phone, a smart mobile phone, a Personal Digital Assistant (PDA), a PDA phone, a notebook, or a tablet, which comprises a signal detecting module 11, a storage module 12, a processing module 13, and a function module 14, whose functions are separately described as follows.

The signal detecting module 11 is, for example, a device supporting Wireless Fidelity (Wi-Fi) or Bluetooth signal detection, or another device which may detect a signal of a Global System for Mobile Communication (GSM) system, a Personal Handy-phone System (PHS), a Code Division Multiple Access (CDMA) system, the Worldwide Interoperability for Microwave Access (WiMAX), a radio repeater, or a radio broadcaster, and the scope thereof is not limited herein. The signal detecting module 11 may detect at least one signal source around the mobile device 10 and may detect at least one signal strength of each signal source. The signal strength is, for example, a Received Signal Strength Indicator (RSSI) value, and the signal source is, for example, an AP supporting Wi-Fi or Bluetooth signal transmission, or a base station which may support systems such as GSM, PHS, CDMA, and WiMAX, and the scope thereof is not limited herein.

The storage module 12 is, for example, any fixed or portable Random Access Memory (RAM), Read-Only Memory (ROM), Flash memory, hard disk, or other similar devices or a combination of these devices, and may be used to store multiple system profiles. In the system profiles, for example, signal sources and signal strengths thereof detected by the mobile device 10 at multiple different locations, and a system setting of the mobile device 10 applicable to these locations are recorded.

The processing module 13 and the function module 14 are, for example, hardware devices formed of logic circuit elements, and may execute a location-aware application function. These modules may also be programs stored in the storage module 12 of the mobile device 10, and the storage module 12 may be loaded with a processor of the mobile device 10, so as to execute the location-aware application function. Embodiments are listed below to illustrate detailed steps in which the mobile device 10 executes the location-aware application.

Figure 2:
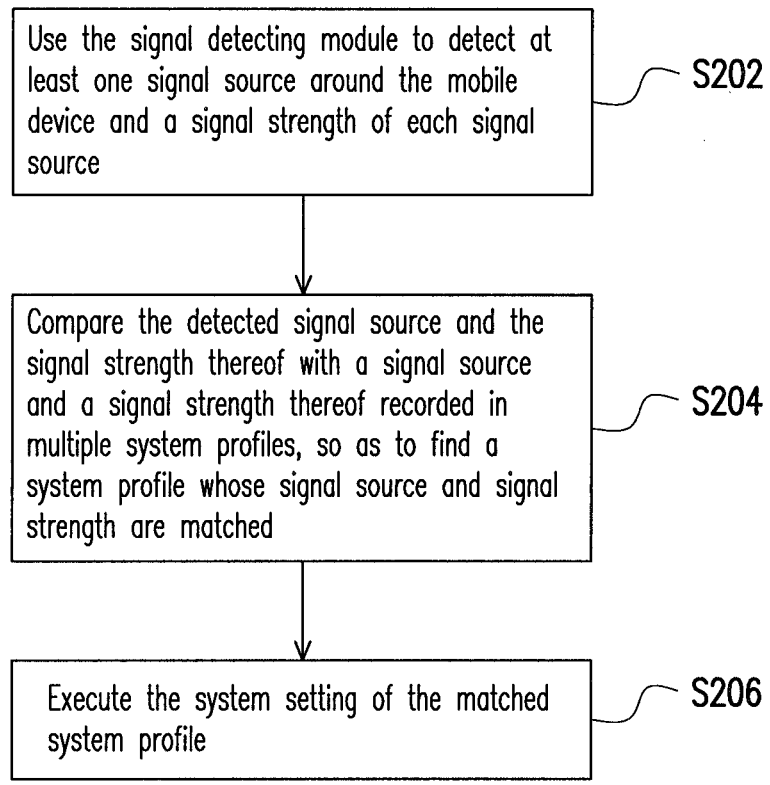
FIG. 2 is a flowchart of a method for a location-aware application according to an embodiment of the present invention.

FIG. 2 is a flowchart of a method for a location-aware application according to an embodiment of the present invention. Referring to FIG. 2, the method of this embodiment is applicable to the mobile device 10 of FIG. 1, and detailed steps of the method for a location-aware application of the present invention are illustrated below in cooperation with elements in the mobile device 10.

First, the mobile device 10 uses the signal detecting module 11 to detect at least one signal source around the mobile device 10 and at least one signal strength of each signal source (step S202). The mobile device 10, for example, uses the signal detecting module 11 to continuously detect for a period of preset time, and scan a peripheral signal source multiple times in the preset time, so as to obtain multiple signal strengths, detected in the preset time, of each signal source. Specifically, considering that a wireless signal is influenced by a peripheral environment and changed rather greatly, in order to remove unstable factors of the signal strength, a relatively stable and trustable detection value may be obtained through detecting signal strengths at different time points and calculating an average thereof.

Then, the processing module 13 compares each signal source detected by the signal detecting module 11 and the signal strength thereof with a signal source and a signal strength thereof recorded in multiple system profiles in the storage module 12, so as to find a system profile having matched signal source and signal strength (step S204). The processing module 13, for example, compares each detected signal source and the signal strength thereof with a signal source and a signal strength thereof recorded in each system profile one by one, so as to find a system profile whose condition is the most approximate and also the most matched.

Finally, the function module 14 applies the system setting of the system profile found by the processing module 13 to the mobile device, so as to execute a system function applicable to the location (step S206). The system function is, for example, a media play device (such as a television or an acoustics) closest to the mobile device 10 to which multimedia streaming is output, and the media play device plays the multimedia streaming output by the mobile device 10.

Through the method, whenever the user returns to a previously detected location and enables the system function, the mobile device detects the peripheral signal source and the signal strength thereof, which are compared with multiple pre-established system profiles, and finds the most appropriate setting value of the location according to a comparison result, thereby implementing a location-aware automatic application.

It should be noted that, the number of the system profiles recorded in the storage module 12 is gradually increased as the location set by the user changes, and in order to reduce the calculation quantity and the calculation time of comparison, an electronic device of this embodiment, for example, first filters the system profiles by using the signal source as a filtering condition, and then for the filtered system profiles, selects a system profile whose signal is the most matched by using the signal strength as a filtering condition. An embodiment is listed below for detailed illustration.

Figure 3:
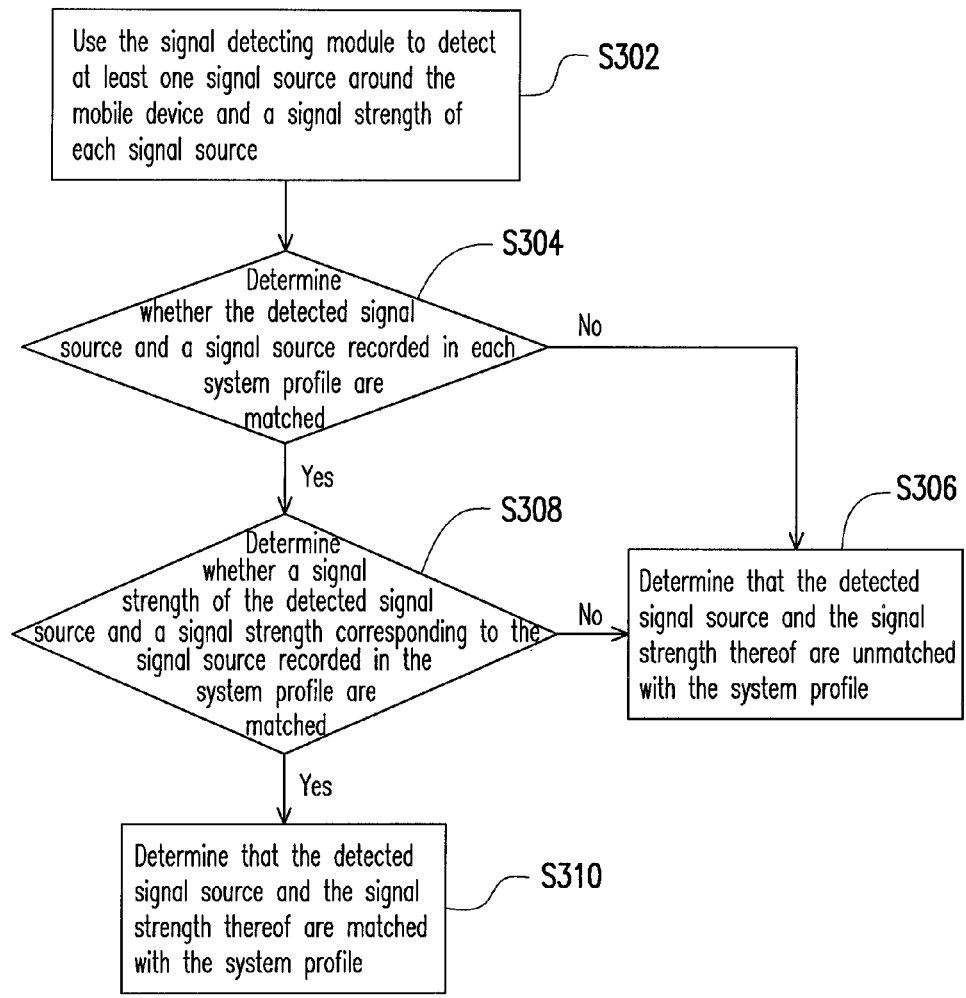
FIG. 3 is a flowchart of a method for finding a system profile having matched signal source and signal strength according to an embodiment of the present invention.

FIG. 3 is a flowchart of a method for finding a system profile having matched signal source and signal strength according to an embodiment of the present invention. Referring to FIG. 3, in this embodiment, after the signal detecting module 11 detects at least one signal source around the mobile device 10 and at least one signal strength of each signal source (step S302), the processing module 13 first determines whether the signal source detected by the signal detecting module 11 and a signal source recorded in each system profile in the storage module 12 are matched (step S304), thereby determining whether to select this system profile to perform subsequent comparison.

Specifically, in addition to storing a signal source and the corresponding signal strength thereof, a system profile further records a group of Service Set Identifier (SSID) and Media Access Control (MAC) address according to a location, an environment, or other conditions for which the mobile device 10 detects the signal source. Hereby, whenever the signal detecting module 11 completes signal source detection, the processing module 13 may compare the SSID of the detected signal source with an SSID of a signal source recorded in each system profile.

If an identifier of the detected signal source and an identifier of the signal source recorded in the system profile are different, it may be determined that the signal source and the signal strength thereof are unmatched with the system profile (step S306), and the system profile is discarded; otherwise, if the identifier of the detected signal source and the identifier of the signal source recorded in the system profile are the same, it is determined that the signal sources are matched, and the system profile may be reserved to perform subsequent comparison.

Specifically, if the signal sources are matched, the processing module 13 further determines whether multiple signal strengths of each detected signal source and a signal strength corresponding to the signal source recorded in the system profile are matched (step S308). If the signal strengths are unmatched, it may be determined that the detected signal source and the signal strength thereof are unmatched with the system profile (step S306), and the system profile is discarded; otherwise, if the signal strengths are matched, it may be determined that the detected signal source and the signal strength thereof are matched with the system profile (step S310). In an embodiment, at the time of determining whether the signal strength of the detected signal source and a signal strength corresponding to the signal source recorded in the system profile are matched, if the difference between the signal strength of the detected signal source and the signal strength recorded in the system profile is within a range, the signal strengths may be regarded as the same.

In addition to recording multiple signal sources in the system profile, multiple signal strengths may be further recorded under each signal source, used as a historical record of the signal strengths, and used as a basis for subsequent matching. Specifically, the detection value of the signal strength of each signal source detected at each location may be influenced due to factors such as electromagnetic wave interference of home appliances or masking of home layouts. In order to ensure the objectivity, in this embodiment, an average may be calculated to be representative of the signal strength of the signal source. For example, an average of a historical record of the fixed number of signal strengths is calculated or a representative value is calculated. Hereby, multiple signal strengths recorded under each signal source are, for example, a set of detected signal strengths of a signal source each time the system profile is matched from beginning of establishing the system profile to now, or a set of the up-to-date fixed number of signal strengths of a signal source, or a set of signal strengths of a signal source detected at the time when the system profile is matched in a period of time, which is not limited herein. Through recording signal strength values for a long time and using an average of these signal strength values to perform matching, a matching result consistent with the current situation may be obtained.

The manner of determining whether the signal strengths are matched is, for example, for each signal source, first calculating a first average of at least one signal strength detected by the signal detecting module 11, and calculating a second average of at least signal strength recorded in the system profile. Then, a difference between the first average and the second average is calculated and compared with a threshold. If the difference is less than the threshold, it may be determined that the detected signal source and the signal strength thereof are matched with the system profile. The difference is, for example, a distance between the first average and the second average on a Gaussian plane, a calculating manner of which is, for example, calculating a squared difference between the first average and the second average.

It should be noted that, in the step S304, only in the case that all signal sources are matched, the mobile device selects the system profile. However, in another embodiment, system profile selection is also applicable to a case that a part of signal sources are matched. Specifically, in a company, in a residential district or in a populated site, the number of signal sources detected by a mobile device at the same time may be very large, even up to dozens, and in this case, it is necessary to relax the comparison condition of the signal sources, that is, in a case that the detected signal sources and signal sources recorded in a system profile are only partially matched, the mobile device may determine whether to select the system profile according to the number of matched signal sources or the proportion of the matched signal sources.

Figure 4:
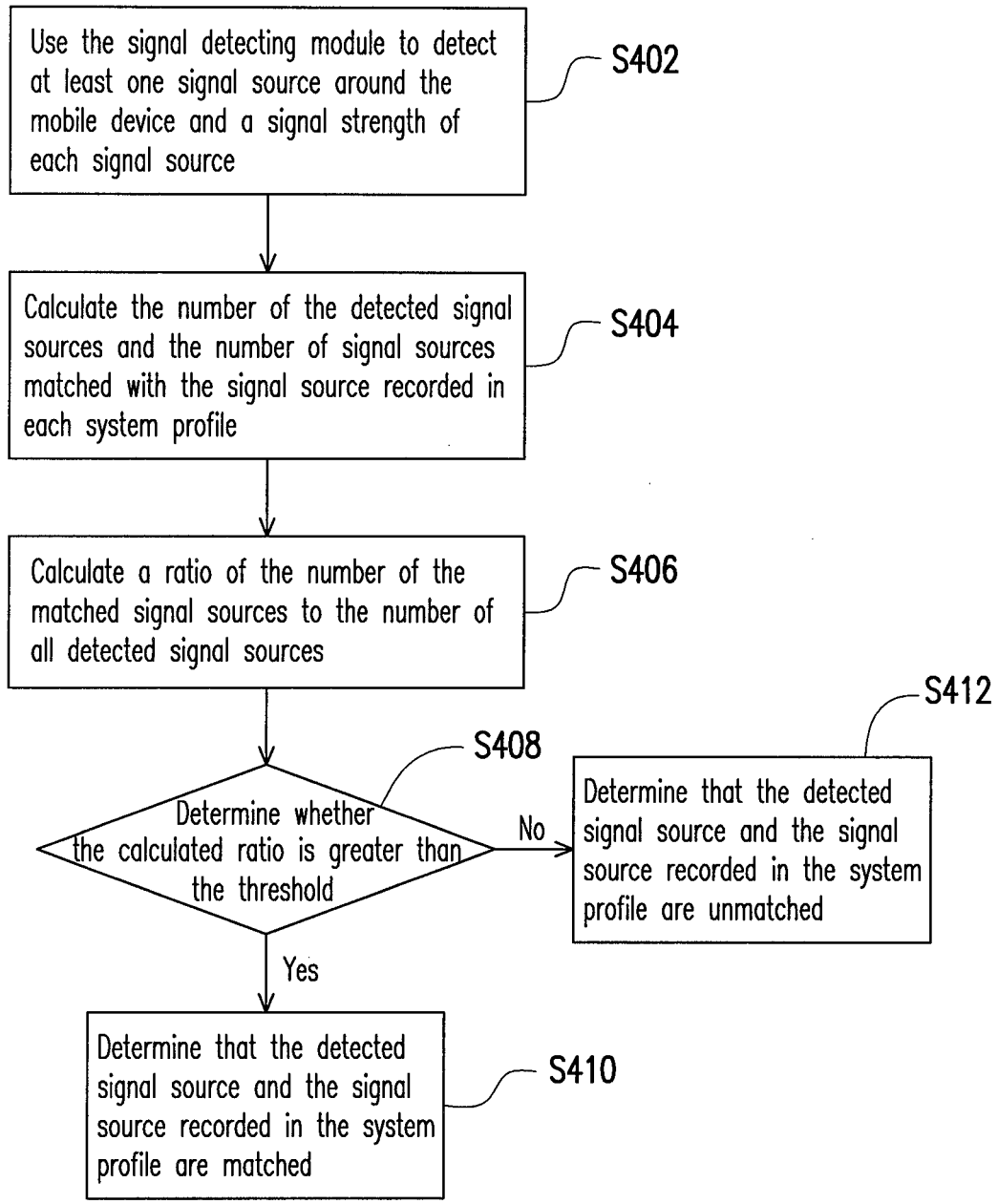
FIG. 4 is a flowchart of a method for comparing signal sources to select a system profile according to an embodiment of the present invention.

For example, FIG. 4 is a flowchart of a method for comparing signal sources to select a system profile according to an embodiment of the present invention. Referring to FIG. 4, for a mobile device, for example, after the signal detecting module 11 detects at least one signal source around the mobile device 10 and at least one signal strength of each signal source (step S402), the processing module 13 first calculates a number of the signal sources detected by the signal detecting module 11 and a number of signal sources matched with the signal source recorded in each system profile (step S404), in which the manner of determining whether to be matched, for example, may use the SSID or other information of the foregoing embodiment, which is not described herein.

Then, the processing module 13 calculates a ratio of the number of the matched signal sources to the number of all detected signal sources (step S406), and compares the ratio with a threshold, so as to determine whether the ratio is greater than the threshold (step S408). If the calculated ratio is greater than the threshold, the processing module 13 may determine that the detected signal source and the signal source recorded in the system profile are matched (step S410); otherwise, the processing module 13 determine that the detected signal source and the signal source recorded in the system profile are unmatched (step S412).

It should be noted that, in order to enable the system profile stored in the mobile device to support determination for more locations, or to be updated in time as the environment changes, the present invention further provides a mechanism for adding and updating a system profile, thereby improving the precision of the location-aware application of the mobile device.

About addition of a system profile: in the step S302, if the processing module 13 determines that the signal source detected by the signal detecting module 11 and a signal source recorded in each system profile in the storage module 12 are unmatched, a system setting interface is, for example, displayed to query the user about whether to add a system profile, so as to record the currently detected signal source and the signal strength thereof. When the user determines to add the system profile, the system profile is provided for the user to select an applicable system setting of the current location, such as an applicable media player. After the user completes the selection or setting, the processing module 13 records the user setting in the added system profile together with the signal source detected by the signal detecting module 11 and the signal strength thereof. Thereby, subsequently, whenever the user returns to the same location, the mobile device may automatically detect and select the added system profile, and execute the system function according to the initial setting of the user.

About update of a system profile: the update here refers to update of signal strengths of each signal source in a system profile, these signal strengths represent a historical record of signal strengths detected at the current location within a particular time range, or a historical record of the up-to-date fixed number of signal strengths, and this historical record may be updated each time the system profile is matched, so that the signal strength recorded in the system profile is more consistent with the current situation. For example, in the step S306, if the processing module 13 determines that multiple signal strengths of each detected signal source and a signal strength corresponding to the signal source recorded in the system profile are matched, the signal strengths of each signal source detected by the signal detecting module 11 are further used to update the signal strength corresponding to the signal source in the system profile. The update may be used to replace the oldest signal strength of the signal source in the system profile or a signal strength which deviates from the average furthest, and the update enables the signal strength recorded in the system profile to be more consistent with the current situation. In another embodiment, the signal strength recorded in the system profile may also be an average. Whenever the system profile is matched, newly detected signal strengths are added to this average to re-calculate a new average, or the old average is replaced with the average of the newly detected signal strengths, and the update likewise enables the signal strength recorded in the system profile to be consistent with the current situation.

Figure 5:
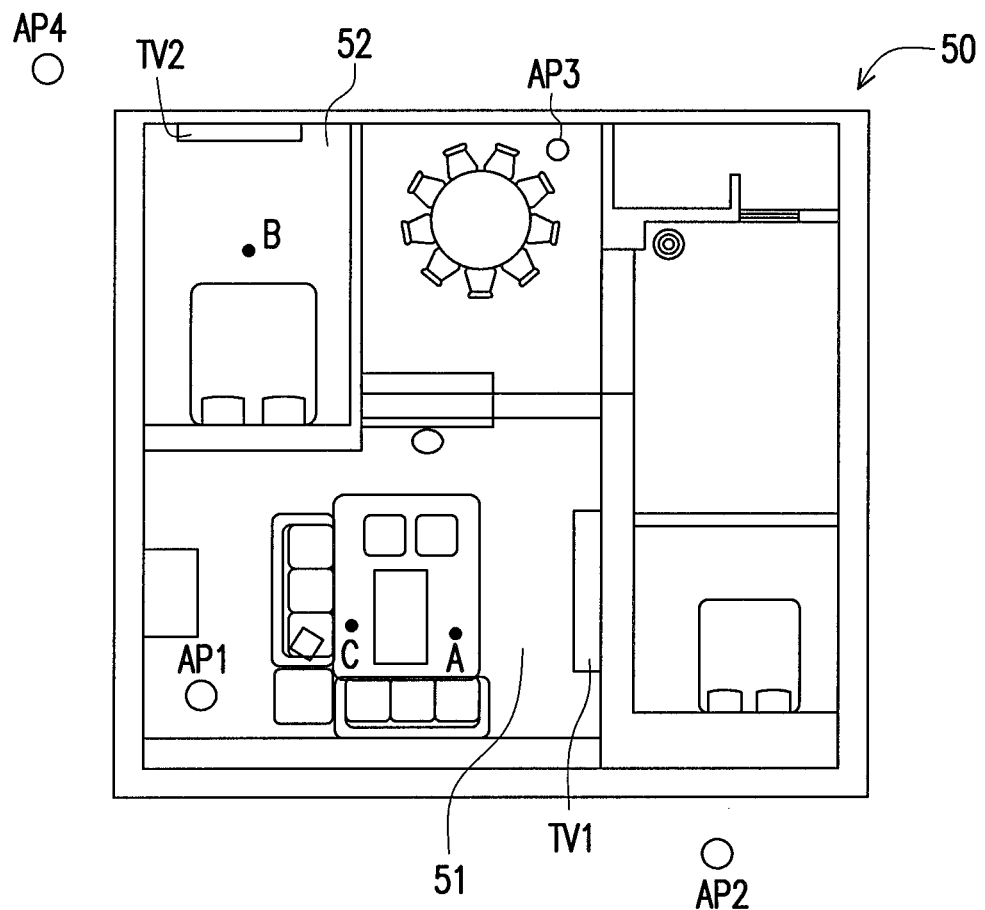
FIG. 5 is an example of a method for a location-aware application according to an embodiment of the present invention.

FIG. 5 is an example of a method for a location-aware application according to an embodiment of the present invention. Referring to FIG. 5, in this embodiment, location-aware applications implemented by the user at different locations in a building 50 are illustrated. The user, for example, enables a location related system function in a mobile device at a location A in a living room 51. In this case, the mobile device, for example, can detect peripheral signal sources AP1, AP2, and AP3 and signal strengths thereof, and compare the peripheral signal sources AP1, AP2, and AP3 and the signal strengths thereof with a system profile built in the mobile device, in which the peripheral signal sources may be in or out of the building 50. When it is found after the comparison that there is no matched system profile, the mobile device, for example, generates a group of SSID and MAC address according to the location, which are recorded in an added system profile $V_A$ in combination with the detected signal sources AP1, AP2, and AP3 and the signal strengths thereof. Furthermore, the mobile device records the system setting (such as using a television TV1 to play multimedia contents) of the user at the location A in the system profile $V_A$.

Then, when the user walks to a location B in a room 52 and again enables the location related system function in the mobile device, the mobile device, for example, can detect peripheral signal sources AP1, AP3, and AP4 and signal strengths thereof, and compare the peripheral signal sources AP1, AP3, and AP4 and the signal strengths thereof with a system profile built in the mobile device. If it is found after the comparison that there is no matched system profile, the mobile device, for example, generates another group of SSID and MAC address according to the location, which are recorded in an added system profile $V_B$ in combination with the detected signal sources AP1, AP3, and AP4 and the signal strengths thereof. Furthermore, the mobile device records the system setting (such as using a television TV2 to play multimedia contents) of the user at the location B in the system profile $V_B$. The system profiles $V_A$ and $V_B$, and the signal sources AP1, AP2, AP3, and AP4 corresponding to the system profiles and the strengths thereof may be recorded as a table in the storage module 12 of the mobile device.

Subsequently, when the user returns to the living room 51 and enables the location related system function in the mobile device at a location C, the mobile device, for example, can detect the peripheral signal sources AP1, AP2, and AP3 and the signal strengths thereof, and compare the peripheral signal sources AP1, AP2, and AP3 and the signal strengths thereof with the system profile built in the mobile device. It may be found after comparison that the signal source and the signal strength thereof in the system profile $V_A$ are matched with the signal source and the signal strength thereof currently detected by the mobile device, and the mobile device may apply the system setting in the system profile $V_A$ to the mobile device, so as to execute a system function applicable to the living room 51, for example, to play multimedia contents shared by the mobile device on the television TV1.

The present invention additionally provides a computer-readable recording medium, which includes a computer program used to execute the steps of the method for a location-aware application, this computer program is basically formed of multiple program code segments (such as, an establishment organization chart program code segment, an approval sheet program code segment, a setting program code segment, and a deployment program code segment), and after these program code segments are loaded into a mobile device and executed, the steps of the method for a location-aware application.

To sum up, according to the method, the mobile device, and the computer-readable recording medium for a location-aware application of the present invention, signals at different locations are detected in advance and the applicable system setting thereof is set. When the mobile device returns to one of these locations, a proper system setting is automatically found and applied, thereby implementing automatic sharing of media contents.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for a location-aware application, applicable to a mobile device comprising a signal detecting module, comprising:

detecting at least one signal source of an access point around the mobile device and at least one signal strength of each of the at least one signal source by using the signal detecting module, wherein the signal source comprises an identification information of the corresponding access point;

comparing each of the detected at least one signal source and the signal strength thereof with a signal source and a signal strength thereof recorded in multiple system profiles, so as to find a system profile having matched signal source and signal strength, wherein the system profiles comprise signal sources and signal strengths thereof detected by the mobile device at multiple different locations, and a system setting of the mobile device applicable to each of the locations; and executing a system setting of the matched system profile to share multimedia content with a target device.

2. The method according to claim 1, wherein the step of detecting the at least one signal source around the mobile device and the signal strength of each of the at least one signal source by using the signal detecting module comprises:

continuously detecting for a preset time, so as to obtain the at least one signal strength, detected in the preset time, of each of the at least one signal source by using the signal detecting module.

3. The method according to claim 1, wherein the step of comparing each of the detected at least one signal source and the signal strength thereof with a signal source and a signal strength thereof recorded in multiple system profiles, so as to find a system profile having matched signal source and signal strength comprises:

determining whether the detected at least one signal source and a signal source recorded in each of the system profiles are matched;

when the signal sources are matched, determining whether the at least one signal strength of each of the detected at least one signal source and a signal strength corresponding to the signal source recorded in the system profile are matched; and when the signal strengths are matched, determining that the detected at least one signal source and the signal strength thereof are matched with the system profile.

4. The method according to claim 3, wherein the step of determining whether the detected at least one signal source and a signal source recorded in each of the system profiles are matched comprises:

for one of the system profiles, comparing an identifier of each of the detected at least one signal source with an identifier of a signal source recorded in the system profile; and when the identifiers are the same, determining that the corresponding signal sources are matched.

5. The method according to claim 3, wherein the step of determining whether the detected at least one signal source and a signal source recorded in each of the system profiles are matched comprises:

calculating a number of the detected at least one signal source and a number of signal sources matched with the signal source recorded in each of the system profiles;

calculating a ratio of the number of the signal sources to the number of the detected signal sources, and comparing the ratio with a first threshold; and when the calculated ratio is greater than the first threshold, determining that the detected at least one signal source and the signal source recorded in the system profile are matched.

6. The method according to claim 3, wherein the step of determining whether the at least one signal strength of each of the detected at least one signal source and a signal strength corresponding to the signal source recorded in the system profile are matched comprises:

for each of the at least one signal source, calculating a first average of the detected at least one signal strength and a second average of the signal strengths recorded in the system profile;

calculating a difference between the first average and the second average, and comparing the difference with a second threshold; and when the calculated difference is less than the second threshold, determining that the detected signal source and the signal strength thereof are matched with the system profile.

7. The method according to claim 6, wherein the step of calculating the difference between the first average and the second average comprises:

calculating a squared difference between the first average and the second average.

8. The method according to claim 3, wherein the step of determining whether the detected at least one signal source and a signal source recorded in each of the system profiles are matched further comprises:

when the signal sources are unmatched, adding a system profile, and recording the detected at least one signal source and the signal strength thereof in the system profile.

9. The method according to claim 3, wherein the step of determining that the detected at least one signal source and the signal strength thereof are matched with the system profile further comprises:

updating the signal strength of the corresponding signal source recorded in the system profile with the signal strength of each of the detected at least one signal source.

10. A mobile device, comprising:

a signal detecting module, detecting at least one signal source around the mobile device and at least one signal strength of each of the at least one signal source;

a storage module, for recording multiple system profiles, wherein the system profiles comprise signal sources of access points, wherein each signal source comprises an identification information of the corresponding access point, and signal strengths thereof which are recorded and detected by the mobile device at multiple different locations and a system setting of the mobile device applicable to each of the locations;

a processing module, connected to the signal detecting module and the storage module, comparing each of the at least one signal source detected by the signal detecting module and the signal strength thereof with a signal source and a signal strength thereof in the system profiles recorded by the storage module, so as to find a system profile having matched signal source and signal strength; and a function module, connected to the processing module, wherein the system setting of the system profile found by the processing module is applied to the mobile device, so as to execute a system function applicable to the location in order to share multimedia content with a target device.

11. The mobile device according to claim 10, wherein the signal detecting module comprises continuously detecting for a preset time, so as to obtain the at least one signal strength, detected in the preset time, of each of the at least one signal source.

12. The mobile device according to claim 10, wherein the processing module comprises:

determining whether the at least one signal source detected by the signal detecting module and a signal source recorded in each of the system profiles in the storage module are matched;

when the signal sources are matched, determining whether the at least one signal strength of each of the detected at least one signal source and a signal strength corresponding to the signal source recorded in the system profile are matched; and when the signal strengths are matched, determining that the detected at least one signal source and the signal strength thereof are matched with the system profile.

13. The mobile device according to claim 12, wherein the processing module comprises:

for one of the system profiles recorded in the storage module, comparing an identifier of each of the at least one signal source detected by the signal detecting module with an identifier of a signal source recorded in the system profile; and when the identifiers are the same, determining that the corresponding signal sources are matched.

14. The mobile device according to claim 12, wherein the processing module comprises:

calculating a number of the at least one signal source detected by the signal detecting module and a number of signal sources matched with the signal source recorded in each of the system profiles in the storage module;

calculating a ratio of the number of the signal sources to the number of the detected signal sources, and comparing the ratio with a first threshold; and when the calculated ratio is greater than the first threshold, determining that the detected at least one signal source and the signal source recorded in the system profile are matched.

15. The mobile device according to claim 12, wherein the processing module comprises:

for each of the at least one signal source, calculating a first average of the at least one signal strength detected by the signal detecting module and a second average of the signal strengths recorded in the system profile in the storage module;

calculating a difference between the first average and the second average, and comparing the difference with a second threshold; and when the calculated difference is less than the second threshold, determining that the detected signal source and the signal strength thereof are matched with the system profile.

16. The mobile device according to claim 15, wherein the difference is a squared difference between the first average and the second average.

17. The mobile device according to claim 12, wherein when the processing module determines that the signal sources are unmatched, the processing module further comprises adding a system profile to the storage module, and recording the detected at least one signal source and the signal strength thereof in the system profile.

18. The mobile device according to claim 12, wherein when the processing module determines that the signal sources are unmatched, the processing module further comprises displaying an interface used to add a system profile, recording the detected signal source and the signal strength thereof in the system profile, and storing the system profile in the storage module.

19. The mobile device according to claim 12, wherein when determining that the at least one signal source detected by the signal detecting module and the signal strength thereof are matched with the system profile in the storage module, the processing module further comprises adding the signal strength of each of the detected at least one signal source to the corresponding signal source recorded in the system profile.

20. A non-transitory computer-readable recording medium, loaded with a program through a mobile device to execute the following steps:

using a signal detecting module of the mobile device to detect at least one signal source of an access point around the mobile device and at least one signal strength of each of the at least one signal source, wherein the signal source comprises an identification information of the corresponding access point;

comparing each of the detected at least one signal source and the signal strength thereof with a signal source and a signal strength thereof recorded in multiple system profiles, so as to find a system profile having matched signal source and signal strength, wherein the system profiles comprise signal sources and signal strengths thereof which are recorded and detected by the mobile device at multiple different locations, and a system setting of the mobile device applicable to each of the locations; and applying the system setting of the found system profile to the mobile device, so as to execute a system function applicable to the location to share multimedia content with a target device.

* * * * *